Figure 3:
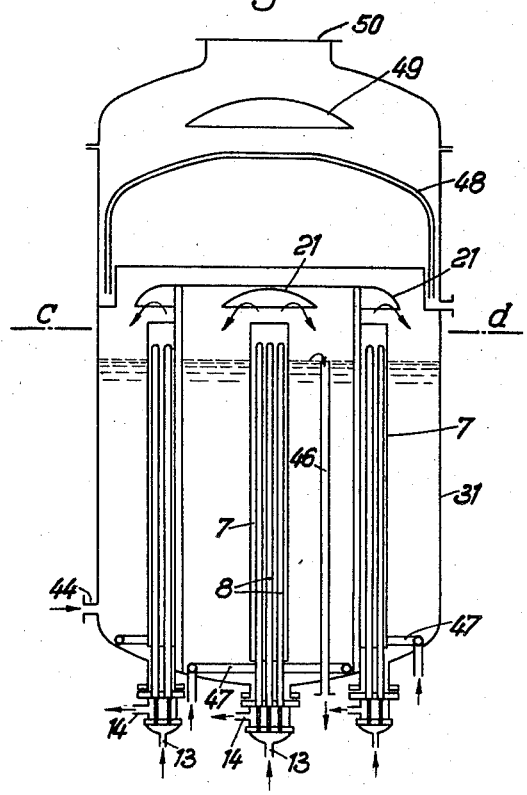

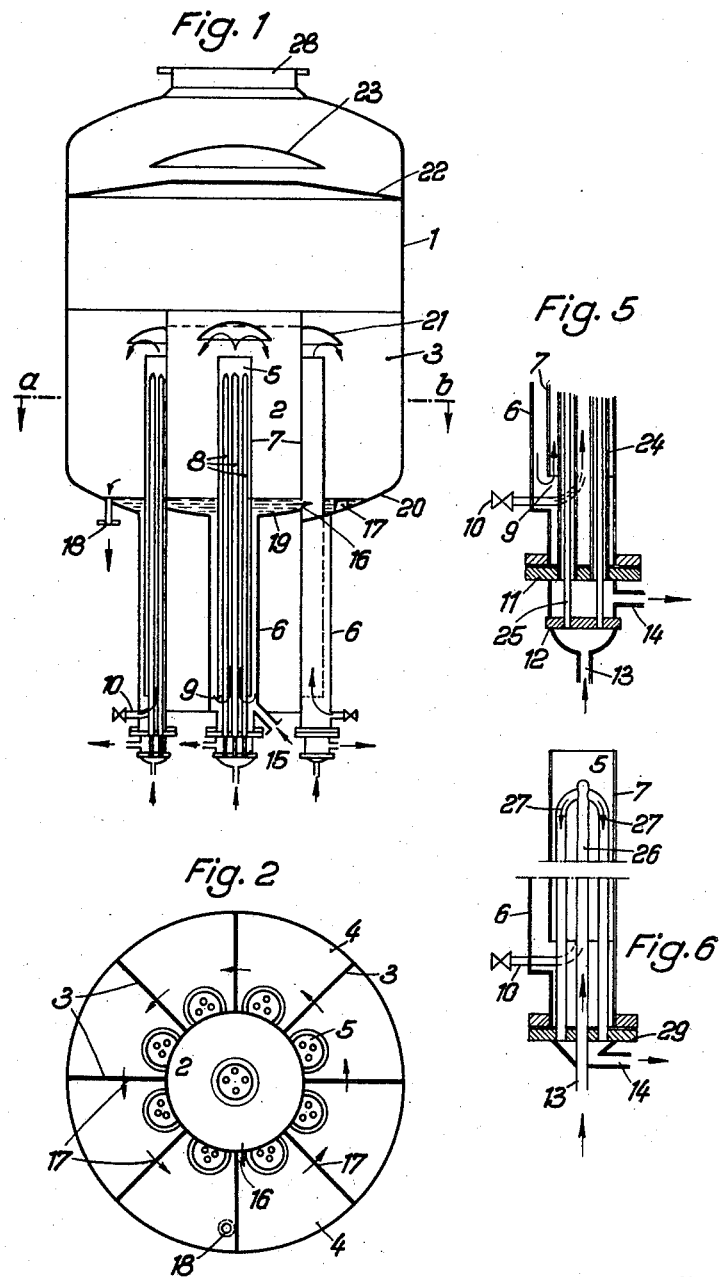
INVENTOR.
KARL SONDERMANN
BY
ATTORNEYS.

Nov. 30, 1954  K. SONDERMANN  2,695,869
DISTILLATION OF ORGANIC LIQUIDS
Filed May 12, 1950  2 Sheets-Sheet 2

INVENTOR.
KARL SONDERMANN
BY
ATTORNEYS.

United States Patent Office 2,695,869
Patented Nov. 30, 1954

2,695,869

DISTILLATION OF ORGANIC LIQUIDS

Karl Sondermann, Sprendlingen, Kreis Offenbach, Germany, assignor to Metallgesellschaft Aktiengesellschaft, Frankfurt am Main, Germany, a German corporation Application May 12, 1950, Serial No. 161,588

Claims priority, application Germany May 16, 1949

15 Claims. (Cl. 202—52)

This invention relates to improvements in the distillation of organic liquids, especially the distillation of mineral oils, other higher hydrocarbons, fatty acids, glycerines, and other higher alcohols.

The invention is applicable not only to liquids in which the major body of the material to be treated is distilled off but also to the treatment of such liquids, in which the impurity or other material to be removed is eliminated by the distillation treatment, while the major body of the liquid remains in the still, e. g. to the deodorization of oils, fats, waxes, resins of vegetable, animal or synthetical origin, which consists of distilling from these substances odor and taste bearing materials including, as the case may be, fatty acids. Such distillation or deodorization is generally effected in a vacuum, advantageously in a high vacuum, i. e. under absolute pressure of about 3–30 mm. mercury. The distillation also includes agitating and circulating the liquid to be treated in the distilling chamber, and passing steam through the liquid in order to prevent decomposition or carbonization at the heat exchanging surfaces. This may be done by known methods in such a way as to elevate the liquid to be treated above its liquid level by means of a suitable gas or vapor, such as steam or the like, according to the principle of pressure-gas liquid elevation or "mammoth pump" and finely dispersing the same into the vapor space of the distilling vessel, so that the substances to be distilled off will be evaporated from a finely dispersed condition. The mammoth pump used for the agitation and circulation is known to consist of an erect tube, i. e. an ascending tube, being arranged in the liquid to be treated and rising above the level of the liquid. The tube is open at the bottom or provided with openings permitting the access of the liquid, and the tube is provided with means permitting the introduction of a gaseous or vaporous carrier agent. The latter will drive the liquid through the ascending tube in such a way that the liquid flows from the opening on the top of the ascending tube and is dispersed in the vapor space of the vessel. The liquid elevated in the vapor space will fall back to the level of the liquid and will then be agitated and circulated again. One can also proceed in such a way as to return the elevated liquid to the main body of the liquid over drip plates, so that the evaporation takes place while the liquid flows downward in a film-like state over these plates. By this known process it is possible to effect the total evaporation under the low pressure produced in the distillation vessel by the devices provided for the establishment of a vacuum. Moreover, it has been proposed to continuously divert part of the liquid elevated above the level of the liquid in order to subject it to a further intensive evaporation in a second distillation stage. This is accomplished, as for example shown in U. S. Patent 2,179,833, in an annular chamber arranged around the central chamber of the first distillation stage and above the level of the liquid in the latter. The liquid to be treated is conducted through both chambers. The cross section of the annular chamber has sometimes been made equal to or preferably even larger than the cross section of the central chamber, in which the first stage of distillation takes place. In order to make the path of the liquid through the annular chamber as long as possible, the latter may be shaped to form a spiral with two or more windings; or several annular chambers are positioned next to one another and/or above one another, in which case the liquid deviated from the central chamber is caused to flow through these chambers consecutively. The height of liquid in the annular chamber may be kept low, as for example considerably lower than that in the first stage of distillation. The heat necessary for the distillation is supplied by steam which is introduced into heating coils or the like, located in the annular chamber or chambers and in the central chamber of the still, out of which the liquid passes into the second stage of distillation.

For the fractional distillation of relatively high boiling liquids such as fatty acids, having a larger boiling range, two or more distilling vessels of this or similar kinds may be arranged in series and each of them fitted with its own condenser for the purpose of separately trapping the condensate. The liquid to be distilled is conducted in consecutive sequence through the serially arranged distilling chambers, and a portion of the circulated liquid may be diverted immediately after it has dropped back to the level of the liquid and conducted to the next distillation chamber.

With another known method for the distillation of mineral oils employing vacuum and steam several circulating devices arranged in parallel, side by side within the distilling vessel continuously propel the oil to be distilled upward by means of steam injected from below into vertically arranged tubes, the oil lifted through the tubes trickling down in thin sheets over suitable installations provided in the vapor chamber of the distillation vessel. The direct transmission to the oil of the heat necessary for the distillation is effected by means of melted substances in such a way that the oil together with the melt are simultaneously elevated by the propelling steam through the ascending tube of the circulating device into the vapor chamber of the distillation vessel. For this purpose, the part of the still, in which the circulating devices are located, is filled with melted substances, as for instance a metal melt, and the oil to be distilled as well as the steam necessary for propelling the oil and the melt are fed via separate lines to the lower parts of the circulating devices. The melt that has been circulated together with the oil drops back to the surface of the remaining melted substance and is conducted through a heating chamber outside of the still and back again into the distillation cycle. One may, however, heat the melt in the still without taking it out of the latter by heating the melt by means of hot gases circulating through heating channels.

A further type of conventional apparatus for the distillation of fatty acids comprises a vessel, containing the fatty acids, which is wholly or partly heated by a vertical, or nearly vertical, heating surface, the vessel carrying within a feed pipe for steam. Near the vertical, or nearly vertical, heating surface a cylindrical part is inserted, leaving between this part and the heating surface a circulating space, in which a steam distributing duct is provided. The introduced steam and the heating effect of the walls of the vessel causes a lively circulation of the liquid to be distilled in the circulating spaces. However, this apparatus is neither intended for nor adapted to continuous distillation, and especially not for distillation in a vacuum. Furthermore, local overheating and subsequent decomposition of the fatty acids to be distilled cannot be avoided with this kind of apparatus, since the circulation of the liquid in the circulating space between the wall of the vessel and that of the inserted cylindrical part is not sufficiently uniform.

According to the present invention the removal by distillation of certain components from liquids having relatively high boiling points, as for example the distillation of mineral oils, other hydrocarbons, fatty acids, glycerine, other higher alcohols or the like or the deodorisation of oils, fats, waxes, resins of vegetable, animal or synthetical origin, is carried out continuously, for instance according to the principle of the mammoth pump, i. e. by using as lifting gas, steam, hydrocarbon vapors or other gases or vapors lowering the partial pressure of the liquid to be distilled, in such a way that the liquid is kept in circulation in a distilling vessel by two or more circulating devices arranged in series with regard to the direction of flow of the liquid, and located in separate liquid chambers. On account of the intensive treatment of the liquid, due to the lively circulation and agitation of the latter, an efficient heat transmission takes place, and the danger of local overheating is eliminated. Furthermore, a low temperature difference between the heating medium and the liquid can be attained, so that working with accordingly lower distillation temperature becomes possible, while at the same time a specifically high evaporation effect is achieved. Moreover, that part of the evaporation which requires higher distilling temperatures is considerably accelerated, so that the liquid is exposed to these high temperatures for a short time only. In this way, a particularly thorough distillation, e. g. of fatty acids, mineral oils and the like, is rendered possible, and an extensive removal of valuable substances from the distillation residues is achieved. Besides, by repeating, according to the present invention, the circulation once or preferably several times in the same vessel, a saving of construction costs of the apparatus as well as of steam required for the distillation or deodorization respectively, is achieved. In addition, the yield of the plant is considerably increased.

As compared with the conventional apparatus in which the liquid to be distilled is first conducted to a central chamber, in which it is circulated by a mammoth pump, and from there to one or several annular chambers arranged around the central chamber for further distillation, this invention effects a lively agitation of the liquid in the last stage of the distillation, which needs the highest distillation temperature and which is the most difficult one. This diminishes essentially the time of distillation and the substances to be distilled off are removed extensively from the liquid, which leaves the still continuously.

Compared with conventional apparatus comprising several distilling vessels connected in series and each equipped with a circulating device, the apparatus used for the process according to the invention is much simpler and of much lower operating cost. In this way with one single apparatus the same output may be reached as up till now with three or more distilling vessels of about the same size.

This invention has the further advantage that the agitation of the liquid in the distilling vessel is extremely intensive. Practice has shown, that on account of this agitation heat transfer from the heating surfaces to the liquid is considerably increased. The heat transfer number is at about twice that of distilling vessels of the known types. This results again in a corresponding increase of the output and makes it possible to arrange the heating elements, which are to deliver the heat of distillation in the ascending tubes of the circulation device, flown through by the liquid at high speed. In this way a good heat transfer is achieved and the liquid is heated at distillation temperature only during its short stay in the ascending tubes of the circulating system while immediately after its temperature is decreased due to the beginning vaporization.

One important advantage of the method and device in accordance with the invention is the fact that the distillation stage immediately following the first distillation stage receives at least a portion of the liquid in pretreated form whereas each of the successive distillation stages receive their liquid in a previous stage pretreated condition. In this manner a gradually intensifying treatment of the liquid is possible resulting in an appreciably increased efficiency of the distillation treatment.

The process according to this invention can, by way of example, be carried out in two or more additional chambers arranged around a cylindrical inner chamber, the liquid being separately circulated in each chamber, as, for example, according to the principle of elevating liquids by gas. The outer chambers are appropriately established by arranging an annular space around the inner cylindrical chamber and subdividing the former into two or more compartments. An opening is provided for the passage of the liquid from the inner cylindrical chamber to the annular chamber. Further openings are provided in the separating walls or partitions of the latter at suitable heights, so that the liquid can flow from the inner cylindrical chamber into one compartment of the outer chamber and out of this compartment in succession through the other compartments. The inner cylindrical chamber may, if desired, be omitted, and the liquid introduced directly into one compartment of the outer distillation chamber. The wall or partition separating the last compartment from the first is without an opening. From the last compartment, the distillation residue, the deodorized oil or the like are drawn off continuously.

The regulation of temperature in the distilling or deodorizing apparatus according to this invention may be effected in the conventional manner, but may also be simplified and appropriately changed by arranging heat exchanging surfaces inside the circulating devices. In this way, the liquid is quickly and gently heated to the respective working temperature while passing through the circulating device, or, if desired, also cooled down to a certain temperature. A thorough mixture of liquid and steam or the like medium, used for agitating and propelling, passes through the circulating device in constant intensive contact with the heat exchanging surfaces, so that due to the lively circulation of the liquid on the one hand the heating is effected very uniformly, thus excluding local overheating, while on the other hand the distillation or deodorization respectively is facilitated by the fact that the major part of it takes place from a liquid in the mist-like dispersed state, in which it emerges from the circulating device. The method of heating the liquid to be treated within the circulating devices is so efficient that it may also be used with advantage in other cases where a circulation of liquids is to be carried out in one or more circulating devices.

The steam necessary for carrying out this process may be introduced to the circulating devices by the simplest means, as, for example, through an open tube with or without a mouthpiece nozzle, and is distributed very uniformly within the liquid during circulation. In this manner the distillation is considerably facilitated and the steam consumpton decreased. In special cases, if for instance a liquid to be distilled contains substances having a low boiling point, the introduction of steam may become more or less superfluous, since a sufficient circulation is caused by the heating of the liquid in the circulating devices and by the partial evaporation of the lower boiling substances in the circulating devices.

The process according to this invention is preferably carried out in a vacuum. In most cases, an absolute pressure of less than 20, preferably less than 5 mm. mercury, e. g. 2–3 mm., is appropriate. The vacuum to be maintained may, however, be varied according to the properties of the liquid to be treated, and may also, if desired, be adjusted to different pressure in the different parts of the process. However, the vapor chambers of several or all parts or stages of the distilling vessel may also be separated from each other, for instance if the process is applied for fractional distillation.

The process according to this invention provides that the liquid to be treated may be introduced first into the central compartment and subsequently passes through the other compartments. In some cases, however, it will be advantageous to conduct the liquid in the opposite direction, particularly if in the one or more compartments, in which the liquid is treated last, the working temperature is to be lower than in the preceding compartments serially connected with the former. Indeed, the central compartment can be insulated comparatively easily against the other compartments, for instance by providing it with double walls. Such insulation involves the advantage that an undesired transfer of heat from one compartment into the other is avoided, which facilitates the regulation of the working temperature in the various compartments.

When applying the process according to this invention for the distillation of fatty acids, mineral oils or the like purposes exposing the substances to be treated to comparatively high temperatures, it will in many cases prove advantageous to make the stay of the liquid in the distilling vessel as short as possible. This may be accomplished, for example, by keeping the liquid quantity in the vessel small and the liquid level as low as possible. In order to be able also in this case to use circulating devices working by the principle of the mammoth pump, the arrangement is made in such a way as to place the lower part of each circulating device below the bottom of the distilling vessel. For instance, the circulating device may consist of a jacket tube being closed at the bottom and extending downwards from the bottom of the distilling vessel, through which jacket tube the liquid will flow downward from the distilling vessel, and consisting further of an ascending tube, the lower part of which is placed in the interior of the jacket tube, and through which the liquid is conducted upwards.

In other cases, for instance for deodorization, it may be advantageous to have larger quantities of liquid in the distilling vessel, which may be achieved by adequately regulating the liquid level in the vessel. The circulating device may then be placed entirely or substantially within the vessel, it being advantageous to provide the bottom of the vessel with closeable openings or sockets for the circulating devices. This will facilitate the fixing of the circulating devices in the distilling vessel, and a simple exchange of the circulating devices and especially of the heat exchangers arranged within the former will be possible at the same time.

The accompanying drawing gives, by way of example, a diagrammatic representation of two devices designed in accordance with the present invention.

Figure 4:
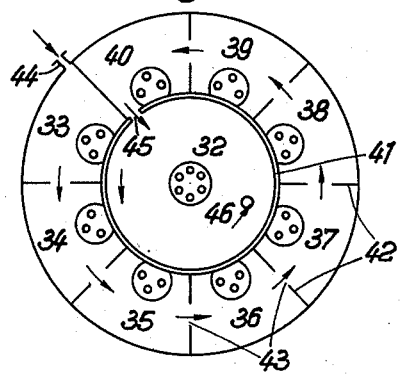

Fig. 1 shows a side view partly in section of a reaction vessel according to the present invention, which is specially suited for the distillation of liquids. Fig. 2 is a section taken on line a—b of Fig. 1. Figs. 3 and 4 show in the same manner a device specially suited for deodorization purposes. Figs. 5 and 6 illustrate details of the circulating devices, also in a vertical section.

In the distilling vessel 1 the cylindrical part 2 is arranged centrally. The annular space around the said cylindrical part is subdivided by the partitions 3. Within the cylindrical part 2 and compartments 4 formed by the partitions, circulators 5 are provided. Each circulator consists of an outer dip pipe 6 extending downward from the bottom of the distilling vessel and containing in its interior the ascending pipe 7, in which the heating tubes 8 are located. The liquid flows from the bottom of the distilling vessel through the dip pipe 6 downward to opening 9, through which it passes to the ascending tube 7. Into the latter the propelling medium, for example steam or vaporized hydrocarbons or the like, is fed through line 10 and propels the liquid entering through opening 9 upwards. On its way upward, the propelling medium is very finely dispersed in the liquid, which simultaneously absorbs heat from the heating tubes. The heating elements consist, for instance, of double tubes. The outer tubes 24 are mounted in bottom 11 and the inner tubes 25 in bottom 12. Through feed line 13 the heating steam flows upward in the inner tubes 25, which are open at the top, and downwards in the outer tubes 24, which are closed at the top. The condensate is discharged through line 14.

The heating elements may also be designed differently, as for example shown in Fig. 6. Instead of double tubes, for example an appropriate central heating tube 26 may be provided in each ascending tube 7. From one end of this tube 26, several tubes 27 are branched off, if desired at different heights, extending parallel to the central tube, so that the heating steam fed from line 13 flows at first through the central tubes 26 and then leaves through the branch tubes 27. The condensate is discharged through line 14. The steam may also be conducted in the opposite direction.

The liquid enters the distilling vessel through line 15, which advantageously opens into the central circulating tube. The liquid is propelled upwards through the latter and dispersed in the vapor chamber of the central compartment, where the distillation takes place. A portion of the liquid collecting again in the lower part of the distilling vessel re-enters the operating cycle of the circulating device. Another portion flows through opening 16 into the compartment 4. In one of the walls of this compartment and in the walls of the subsequent compartments openings 17 are provided, so that the liquid, which is agitated and circulated separately in each compartment, passes through these openings successively into each compartment until it is discharged from the last compartment through line 18. The wall between the first and last compartment is without an opening.

If the quantity of liquid in the distillation vessel is to be kept as small as possible, it is advisable to arrange the bottom 19 of the central chamber 2 somewhat higher than the bottom 20 of the distilling vessel. Above the circulating devices deflecting plates 21 may be provided. Furthermore, in the upper part of the distilling vessel installations 22 and 23 are arranged, by means of which liquid particles carried along with the withdrawn vapors are retained. The circulating tubes in the compartments 4 may preferably be mounted next to the outside of the cylindrical part 2. This arrangement is advisable for constructional reasons and assures at the same time a good distribution of the circulated liquid in the different compartments 4. It is not necessary in this case to use a circular cross section of the circulating tubes in the compartments 4, and for the purpose of facilitating the distribution of the liquid the horseshoe-like shape shown in the drawing or other suitable shapes may be chosen, for example.

If for example fatty acids are the intended distillation product, a mixture of fatty acid vapors and steam flows through the outlet 28 into a vacuum plant of conventional construction (not shown), which may be for instance designed according to U. S. A. Patent 1,713,431 and by means of which for instance an absolute pressure of 3 mm. mercury is produced in the distilling vessel. The distilling temperature may be kept higher in the one or several last compartments than in the one or several first compartments.

In case several fractions are to be distilled, this may be accomplished, for example, by closing the vapor space of the central distilling chamber toward that of the annular part of the still. The vapor space of this annular part may likewise be subdivided once or several times.

For every vapor space a special discharge conduit to separate condensors may be provided, permitting, if desired, rectifying distillation, which can be performed under differential vacuum for each individual vapor space.

The device as shown in Figs. 3 and 4, being particularly suitable for the deodorization of oils, fats, waxes, resins and the like, consists of a deodorizing vessel 31 having a central chamber 32, which latter is surrounded by an annular space subdivided into eight chambers 33, 34, 35, 36, 37, 38, 39, 40. The central chamber is separated from the annular space by a double wall 41. In the walls 42, which separate the chambers of the annular space, openings 43 are provided for the passage of the liquid to be treated, however, the wall between the chambers 33 and 40 is without an opening. The oil enters chamber 33 at point 44 and passes in succession through all of the chambers until it reaches chamber 40 from which it flows through the opening 45 into the central chamber 32. From the latter it is drawn off through line 46. In this way, and due to the intensive agitation and circulation effected in each of the chambers, the vapor exerts a highly intensive effect upon the oil or fat and the deodorization of the oil or fat is extremely effective and takes a comparatively short time. Thus the new device operates with great efficiency.

The deodorization may be further improved by introducing into the chambers, at the bottom of the latter, by means of sprinklers 47 for example, gases or vapors, such as steam, gaseous or vaporous hydrocarbons, hydrocarbon derivates, such as alcohols or the like. The same devices may also be applied for the distillation.

The same circulating and heat exchanging devices as those provided in the reaction vessel according to Figs. 1–2 are applied also in this case.

The heat exchangers make it possible to vary the temperature of the liquid during the reaction. For example, oil, fat or the like may in the first chamber be adjusted at the required temperature, which latter is maintained in the consecutive chambers, whilst the temperature may be decreased in the one or several last chambers.

Moreover, this device may be equipped in the conventional manner, for instance with a hood 48 with double wall, preventing the condensate from flowing back from the uppermost part of the vapor space into the liquid to be treated, or with drip catchers 49 or similar appliances. Through opening 50 the gaseous and vaporous substances leave the deodorizing vessel. They flow into a condensing plant or the like, which produces in the vessel the vacuum required for deodorization, for example an absolute pressure of 4–30 mm. mercury. A common vapor space may be provided for all deodorizing compartments. The vapor space may also be partitioned, for instance in such a way, that the vapors flowing from the central chamber 32 may be drawn off separately from those leaving the other chambers. The vapor space of the annular chamber may also be partitioned, which may be done, if desired, once or several times in order to separately withdraw the vaporous substances from the various deodorizing chambers or groups of chambers.

What I claim is:

1. In the distillation treatment of organic liquids the improvement which comprises establishing a single confined distillation space, subdivided into a multiple number of series-connected separate reservoir bodies of such liquid in substantially contiguous sequence, including at least one first and one last such body, continuously subjecting the liquid in each of said reservoir bodies to separated distillation including substantially continuously dispersed-gas propelling a portion of such liquid from the reservoir body upwardly through a confined path, substantially continuously discharging and dispersing liquid from said confined path into a vaporization zone, the liquid from at least a portion of said bodies being discharged and dispersed into the same vaporization zone, maintaining a pressure-temperature relation for said liquid and said zone sufficient for partial vaporization of said liquid, and substantially continuously returning non-vaporized liquid to the reservoir body, substantially continuously feeding fresh liquid to the first said reservoir body, substantially continuously discharging residual liquid from the last said reservoir body and substantially continuously passing reservoir body portions of liquid in sequence from reservoir body to reservoir body between said first and last reservoir body.

2. Improvement according to claim 1 in which said pressure-temperature relation is maintained in each of said path by dispersed-gas propelling the liquid therethrough in heat exchange relation to at least one heated surface extending within said path.

3. Improvement according to claim 2 in which a multiple number of at least three such reservoir bodies is established including at least one first, one intermediate and one last such body.

4. Improvement according to claim 3 in which the heated surfaces extending within the said paths are each maintained at a different temperature with the temperature of the heated surfaces increasing and then decreasing from said first to said last reservoir body.

5. In a still for the distillation treatment of organic liquids the improvement which comprises a still housing, partitions defining within said housing a multiple number of separated distillation chambers arranged in substantially endless sequence and including at least one first and one last such distillation chamber, each said distillation chamber defining with its lower part a reservoir for such liquid, the upper part of said still housing defining a common vapor space for at least a portion of said chambers, at least one riser duct positioned with its lower end within the interior of said reservoir and having a substantially open upper end, said riser duct having means for introducing gas into its lower end, heating means extending within said riser duct, means for feeding liquid to the first such chamber, means for discharging liquid from the last said chamber, and duct apertures in all partitions between adjacent chambers other than in the partition between said first and last chambers.

6. In a still for the distillation treating of organic liquids, the improvement which comprises a still housing, a substantially centrally arranged first substantially cylindrical partition therein, a multiple number of second partitions substantially radially extending from said first partition to substantially said housing to thereby define a multiple number of distillation chambers in endless sequence including a first and a last such chamber, at least one aperture in said first partition defining at least one duct between said first chamber and the interior of said first cylindrical partition, at least one duct aperture in each of said second partitions, other than the partition between said first and last chambers, duct means between the still exterior and said first partition interior, duct means between the still exterior and said last chamber, the upper part of said still housing defining a common vaporization space for and overlying all of said chambers and said first partition interior in open communication therewith, in each distillation chamber at least one riser duct positioned with its lower end adjacent the still bottom and having a substantially open upper end, said riser duct having means for introducing the gas into its lower end, and heating means extending within said riser ducts.

7. Improvement according to claim 6, in which said heating means include tubular heating members and means for circulating a heating medium therethrough.

8. Improvement according to claim 7, in which said first partition is defined by a double walled insulating member.

9. Improvement according to claim 6 in which said riser ducts are positioned at the periphery of said first position partition with one riser duct positioned in the center thereof.

10. Improvement according to claim 9 in which said heating means include tubular heating members and means for circulating a heating medium therethrough.

11. Improvement according to claim 10 in which said first partition is defined by a double walled insulating member.

12. Improvement according to claim 11 in which said insulating member defines a substantially annular space, and in which means are additionally provided for applying a vacuum to said space.

13. In a still for the distillation treatment of organic liquids, the improvement which comprises a still housing, partitions defining within said housing a multiple number of series-connected distillation chambers including at least one first and at least one last chamber, each said distillation chamber defining in its lower part a liquid reservoir, at least one open-ended riser duct positioned with its lower end within the interior of said reservoir, and with its upper end terminating within a vaporizing space defined within said housing, above and in communication with said reservoir, said vaporizing space being common to at least a portion of said chambers, heating means positioned in each said chamber, means for passing liquid to the reservoir of said first chamber for series-flow through all said chambers, and means for discharging liquid from said last chamber.

14. Improvement according to claim 13, in which said heating means are positioned within said riser ducts.

15. Improvement according to claim 14, in which said heating means include tubular heating members and means for circulating a heating medium therethrough.

References Cited in the file of this patent

UNITED STATES PATENTS

| Number | Name | Date |
|---|---|---|
| 896,460 | Prache et al. | Aug. 18, 1908 |
| 995,776 | Dunn | June 20, 1911 |
| 1,371,784 | Griere | Mar. 15, 1921 |
| 1,376,631 | Newton et al. | May 3, 1921 |
| 2,163,303 | Bonotto | June 20, 1939 |
| 2,179,833 | Sonderman | Nov. 14, 1939 |
| 2,184,579 | Brucke | Dec. 26, 1939 |
| 2,224,025 | Sonderman | Dec. 3, 1940 |
| 2,224,925 | Potts | Dec. 17, 1940 |

FOREIGN PATENTS

| Number | Country | Date |
|---|---|---|
| 321,378 | Germany | July 7, 1920 |
| 61,219 | Sweden | July 27, 1926 |
| 394,587 | Great Britain | June 20, 1933 |
| 814,392 | France | Dec. 2, 1936 |